David B. Day's Imp.d Floating Thermometer.

No. 74997 — Patented Mar. 3 1868

Witnesses.
Harry Moseley
H. A. Mosley

Inventor.
David B. Day

United States Patent Office.

DAVID B. DAY, OF NEW YORK, N. Y.

Letters Patent No. 74,997, dated March 8, 1868.

IMPROVEMENT IN FLOATING THERMOMETERS.

*The Schedule referred to in these Letters Patent and making part of the same.*

TO ALL WHOM IT MAY CONCERN:

Be it known that I, DAVID B. DAY, of New York, in the county of New York, and State of New York, have invented a new and improved Floating Thermometer; and I do hereby declare that the following is a full, clear, and exact description thereof, which will enable those skilled in the art to make and use the same, reference being had to the accompanying drawings, forming part of this specification, in which—

Similar letters of reference indicate corresponding parts in all the figures.

In bringing milk to a proper temperature for churning, the most common method for observing its temperature is to take an ordinary thermometer and stir it about in the milk from time to time, and observe the temperature, the thermometer being removed from the milk and laid aside after each test.

The object of this invention is to facilitate such observations of temperature by constructing a thermometer in such manner that it will float on the surface of the milk, and show the temperature at any time, without the trouble of inserting and removing the thermometer at each observation, and agitating it about until the temperature of the milk has been imparted to the mercury.

Figure 1:
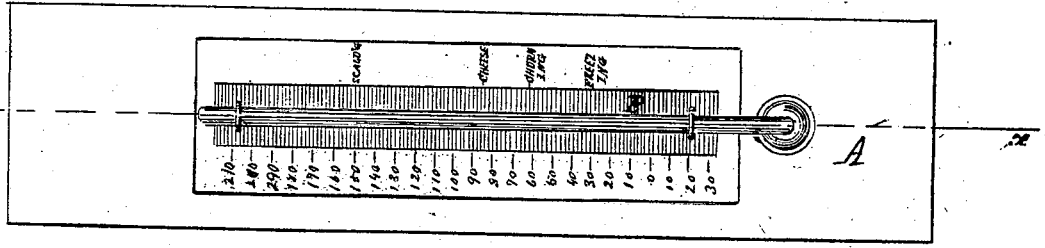
Figure 1 is a plan view of my invention.
Figure 2:
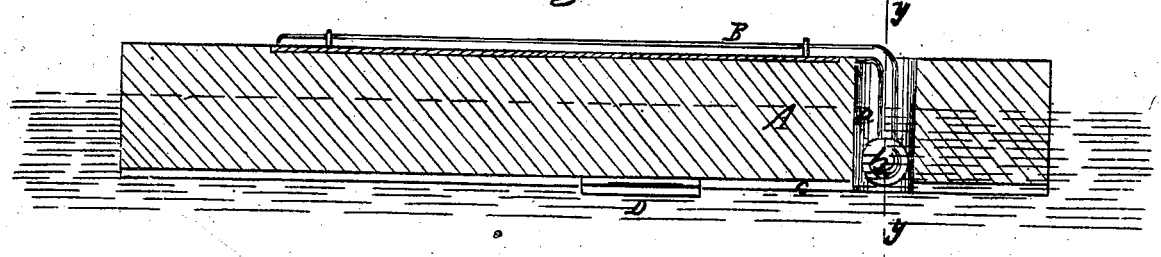
Figure 2 is a vertical longitudinal section of the same, taken in the line x x, fig. 1.
Figure 3:
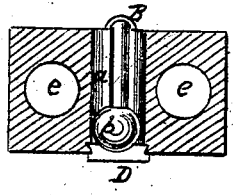
Figure 3 is a cross-section, taken in the line y y, fig. 2.

I construct my floating thermometer as follows: A wooden float, A, is provided, and a vertical hole, a, bored through it. The thermometer-tube B is then bent near its bulb, b, (fig. 2,) so that the bulb may occupy the hole or cavity a, and extend downward into the milk, while the tube B lies flat on the upper side of the float. By this means the bulb of the thermometer is immersed in the milk, while the tube lies horizontally or in the best position for observation. In the bottom of the block or float A is a groove, c c, fig. 2, in which slides a weight, D, to so regulate the weight of the float as to make it set level in the liquid. This weight D may be made heavier, so that by sliding it to the bulb-end of the block the float and thermometer will take up an inclined position, if desired. In cases where heavy kinds of wood, which will take a fine finish, are employed for the float, I increase the buoyancy of the blocks by boring holes e e, fig. 3, longitudinally in each side of the block, and nearly through its entire length, and then plug up the mouths of the holes with a like quality of wood. This thermometer may be employed in cheese-making, and also for measuring the temperature of liquors and other liquids.

I do not confine myself to this particular construction of float, as any suitable material or construction may be employed; nor do I confine myself to a reclining thermometer, as they may be made to stand vertically in the fluid like a lactometer.

Having thus described my invention, what I claim as new, and desire to secure by Letters Patent, is—

1. I claim the float A, bent thermometer-tube B, and adjustable ballast-weight D, constructed and combined substantially as and for the purpose herein set forth.

2. I claim a thermometer for measuring the temperature of liquids, so constructed as to be suspended therein by means of a float making a part of the instrument, substantially in the manner and for the purpose set forth.

DAVID B. DAY.

Witnesses.
HARRY MOSELEY,
F. A. MORLEY.